(12) United States Patent
Collins et al.

(10) Patent No.: US 9,169,671 B1
(45) Date of Patent: Oct. 27, 2015

(54) MOTIVATIONAL REWARD SYSTEM

(76) Inventors: Joy S. Collins, Barboursville, VA (US); Adam J. Collins, Barbouseville, VA (US)

(*) Notice: Subject to any disclaimer, the term of this patent is extended or adjusted under 35 U.S.C. 154(b) by 17 days.

(21) Appl. No.: 13/442,674

(22) Filed: Apr. 9, 2012

Related U.S. Application Data

(60) Provisional application No. 61/472,892, filed on Apr. 7, 2011.

(51) Int. Cl.
*E05B 47/00* (2006.01)
*A45C 11/32* (2006.01)

(52) U.S. Cl.
CPC ..................... *E05B 47/00* (2013.01)

(58) Field of Classification Search
CPC ............................. A45C 11/32; E05B 47/00
USPC ............................................ 434/128, 238
See application file for complete search history.

(56) References Cited

U.S. PATENT DOCUMENTS

| | | | | |
|---|---|---|---|---|
| 5,292,003 A * | 3/1994 | Baghdassarian | ............... | 206/575 |
| 6,899,626 B1 * | 5/2005 | Luciano et al. | ................. | 463/25 |
| 7,132,925 B2 * | 11/2006 | Johnson et al. | ............. | 340/5.73 |
| 2005/0146419 A1 * | 7/2005 | Porter | .......................... | 340/5.73 |
| 2007/0018791 A1 * | 1/2007 | Johnson et al. | ............. | 340/5.73 |
| 2008/0138784 A1 * | 6/2008 | Adler | ............................ | 434/332 |
| 2008/0270240 A1 * | 10/2008 | Chu | ............................... | 705/14 |
| 2009/0307961 A1 * | 12/2009 | Walter et al. | ..................... | 43/61 |

* cited by examiner

*Primary Examiner* — Sam Yao
*Assistant Examiner* — Thomas Hong
(74) *Attorney, Agent, or Firm* — Sheldon H. Parker, Esq

(57) ABSTRACT

A motivational device having an enclosure comprising an electronics receiving area, a closure plate, at least four sides and a door within a front plate. The electronics receiving area has a top surface, a bottom plate, a front plate and sides and contains a microprocessor programmable with primary user-determined criteria and an access code and providing data entry and data display. The at least four sides are connected to the electronics receiving area and closure plate and enable viewing of the interior of the enclosure while preventing access. The unlocking and locking of the door is electronically controlled and also enables viewing of the interior of the enclosure.

14 Claims, 6 Drawing Sheets

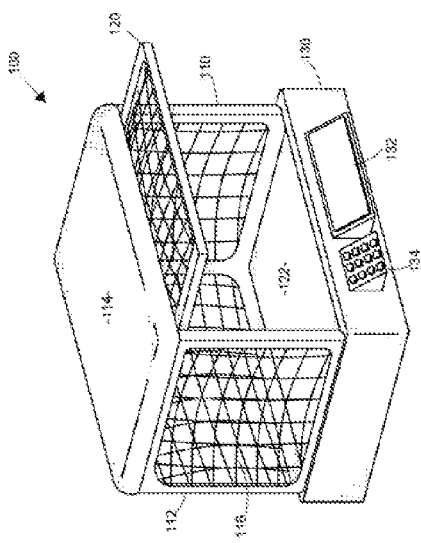
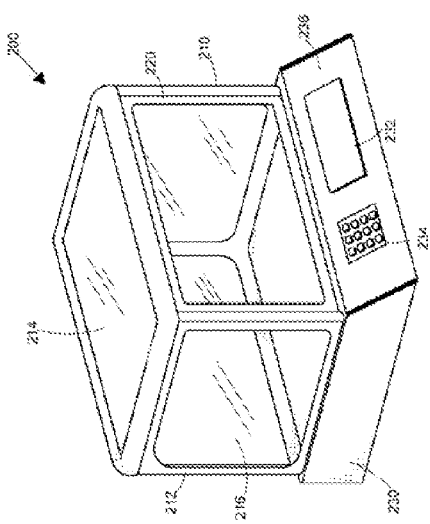
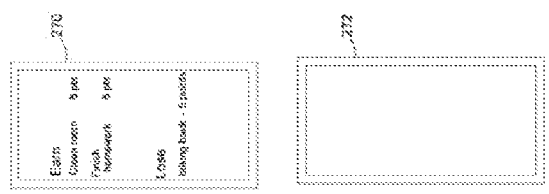
Figure 1
Figure 2
Figure 3

MOTIVATIONAL REWARD SYSTEM

FIELD OF THE INVENTION

The disclosed invention relates to a reward system that can be used for children and/or adults. Points are awarded based on predetermined behavior and the "reward", locked into a case or enclosure, remains within the enclosure until a preset number of points are received.

BACKGROUND OF THE INVENTION

Motivation can be difficult for both children and adults and many methods have been used in an attempt to increase motivation. In children the lack of motivation is generally focused around the areas of behavior and education.

Motivating a child to exhibit good behavior is a challenge faced by every parent. Parents often resort to punishment for bad behavior as a means for motivating good behavior. However, child development specialists generally agree that negative rewards for bad behavior are not as effective as positive rewards for good behavior.

In an attempt to increase reward motivation in education, computer programs and freestanding machines have been developed. Most of these, as used in education to motivate student learning, reward the student for correct answers using only intangible rewards.

A diversity of educationally oriented commercial copyright software, shareware software, and public domain software exists and can be found in the homes of most owners of personal computers. These educational programs quiz students with questions on a variety of subjects including spelling, language, math, and other subjects. A large percentage of the educational software includes graphic effects, tallying of scores, printed readouts, and special audio effects to reward students upon successful completion of the problem and motivate continued utilization of the software. However, students frequently become less and less motivated by these pseudo-rewards due to their intangible and repetitive nature. In fact, many students tend to stop using the educational software programs altogether.

One issue with computer games, marbles in the jar, and other reward systems on the market is the lack of reward tangibility. Especially for children, the promise of a reward they cannot see or touch makes it difficult to focus on the objective and be motivated to continue the positive behavior.

Other examples of reward systems would be Use Your Marbles, Smilemiles.com and sticker charts. Use Your Marbles is a very simple reward system with the reward written on a board instead of being in an enclosure or having a picture of the reward. It consists of a jar of marbles and two shot glass size glasses which hold 4 marbles per day. The kids lose their marbles for bad behavior during the day. The marbles remaining at the end of the day go into the big jar. After the marbles reach the reward line, they get the reward. This system does not have the visual stimulation or the usefulness of the disclosed system and it is doubtful that anyone would use this system other than for young children. Online reward systems such as Smilemiles.com require a computer and do not provide the tangible reward as with the disclosed system.

Entry of data may also be delayed if the computer is in use or otherwise inaccessible. Sticker charts can be fun for younger children however as the children get older there is little appeal to getting a star on a chart. Further, not many adults would consider using sticker charts for themselves. Even small children become bored quickly and lose interest in sticker charts.

SUMMARY OF THE INVENTION

In the disclosed invention, the selected prize is tangible and positioned at the entry area of the points for the child to see and in some instances touch. In this way, every time the points awarded for good grades or behavior are entered, the child sees the prize.

Children are not the only ones who benefit from a reward at the end of a goal. Many diet gurus advise taking clothing of the desired size and hanging it in a visible place. The problem with this is progress is not recorded unless a chart is kept at some location. With the disclosed device, the clothing would be out of the way and, as the daily weight is entered, the system can be programmed to have coordinating graphics and sound.

The disclosed system can also add fun way the monitor progress with already existing programs for dieting, smoking, etc. by setting and reaching goals.

A motivational device having an enclosure comprising an electronics receiving area, a closure plate, at least four sides and a door within a front plate. The electronics receiving area has a top surface, a bottom plate, a front plate and sides and contains a microprocessor programmable with primary user-determined criteria and an access code and providing data entry and data display. The at least four sides are connected to the electronics receiving area and closure plate and enable viewing of the interior of the enclosure while preventing access. The unlocking and locking of the door is electronically controlled and also enables viewing of the interior of the enclosure.

The sides, top and front of the device are at least opaque or alternatively can be transparent. When opaque material is used the interior of the enclosure is viewed through windows. To prevent access to the interior, the windows are covered with an open weave material or a transparent, solid material. The construction of the device can be such that it can be stored and shipped flat with all components separate, and assembled by the user. In some embodiments, the method of attachment can be such that the device can be easily disassembled.

The data entry can be through a keypad, arrows or touch screen. The display can be through standard screen or incorporated into the touch screen. Preferably the front plate of the electronics receiving area is angled to enable easier viewing and use. The electronics optimally also have graphics and sound and are programmable by the primary user through data entry and/or downloading. Point charts can also be provided to reflect the points awarded or removed for an event.

When more than one secondary user is desired, a second partial enclosure can be used that is connected to the electronics receiving area. This enables two separate enclosures and separate users.

To use the device, a reward item is placed into the primary user programmed enclosure with the total number of points required to unlock the door entered using the access ID. Points are either added or subtracted, depending upon the action, each entry being met with sound and graphics. When the desired number of points has been reached, the door is unlocked and the reward removed.

BRIEF DESCRIPTION OF THE DRAWINGS

FIG. 1 is a perspective view of an example embodiment of the disclosed motivational system having a button keypad, screen and mesh walls in accordance with the invention;

FIG. 2 is a perspective view of an alternate example embodiment of the disclosed motivational system having a touch screen keypad, touch screen and transparent, solid walls in accordance with the invention;

FIG. 3 is front view of example note boards, in accordance with the invention;

DETAILED DESCRIPTION OF THE INVENTION

Definitions

Figure 4:
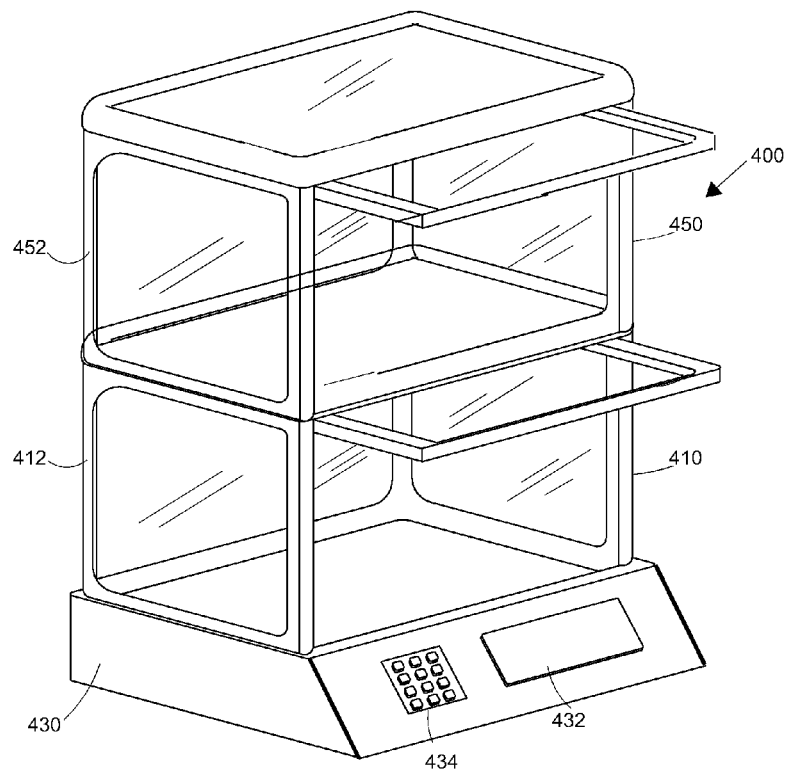
FIG. 4 is a perspective view of another example embodiment of the disclosed motivational system having dual enclosures, a touch screen keypad, touch screen and transparent, solid walls in accordance with the invention.

As used herein the term "enclosure" shall refer to any enclosure, such as a box or sphere on a base, having any number of sides.

As used herein the term "primary user" shall refer to any person having the access code to program the microprocessor.

As used herein the term "secondary user" shall refer to any person for whom the device is being used. In some instances, where an adult is using the device for themselves, they would be both the primary and secondary user.

The disclosed system increases motivation by a combination of the proximity of the reward and the use of interactive feedback by having the reward immediately accessible upon achievement of the predetermined number of points or through the meeting of other criteria. Generally the criteria can be translated into points, e.g. completing a daily exercise routine with a reward at the end of the week, however in some instances the criteria is not easily translated to points. In these instances, the specific goals or steps can be programmed into the microprocessor, along with applicable graphics, and reflected on the screen.

A reward of choice (or a representation of such if larger than the enclosure) is locked in the enclosure (while remaining visible) and when the predetermined number of points have been gained, the enclosure will open so the reward can be retrieved. It is 100% customizable and can be used in any situation in which a little extra motivation in reaching a goal would be useful.

The disclosed system provides the little bit of extra motivation needed to encourage people to meet their own goals or help people to encourage good behavior from others (children, students, employees, patients, etc). It will allow people to "keep an eye on the prize", while providing positive reinforcement for making advancement towards meeting their goals and encouragement when they may slip. Children can gain points for specified chores, good behavior, good grades or whatever the parents are trying to motivate them to do better. Adults can use it as motivation to keep up exercise routines, eat healthy, clean the house, cook dinner, save money, or anything else they may want to work on. They could also use it to help them stop bad habits, such as smoking, drinking, cussing or any other habits they would like to break. They could get a specified amount of points for each day they did not do whatever they are trying to stop (the points being based on how long they feel they should go prior to gaining the reward). If they perform the act, they have to start back at zero. The uses are limitless.

The reward can be anything that will encourage the person needing the motivation with the general stipulation being that it must be eventually affordable and obtainable. In most instances it would not be very motivating to include a picture of something beyond ones means or that is otherwise unobtainable, although this can be applicable in some situations. The reward does not have to be something that costs a lot of money and can be such items as a handmade coupon for an extra ½ hour of TV time or for one night of staying up later than usual. It could be as simplistic or complex as necessary to accomplish the set goals. The reward merely needs to be desirable. The reward could also be something that is already owned that has been taken away for bad behavior. If a teenager stays out past curfew too many times, their car keys or their cell phone could be put into the enclosure and they would have to earn the right to get them back. The same goes for a younger child. A favorite toy could be taken away due to bad behavior and they would be required to earn the toy back. It could be used for a special toy that a parent wants to give to their child, but does not have a "reason" or "excuse" to buy it, such as Christmas or a birthday. Instead of just buying their children things for no reason, they can put them in the enclosure and require the children to earn them. This is a great way for kids to gain the concept of having to work for something and earn it, rather than just have everything handed to them. Adults working on losing weight could have a reward of a gift card to their favorite clothing store which they will get once they have lost a set number of pounds. The reward could be a vacation or a high dollar purchase and once 100% of the money needed has been saved, the enclosure will open signifying that they are ready to start booking their vacation or to make the high dollar purchase they have been working towards. Again, the possibilities are limitless.

The reward system can be manufactured from plastics, composites, wood, metal or other materials convenient that meet the criteria set forth herein. The method of manufacture will be dependent upon the material used and will be known to those skilled in the art. Although it is convenient for the box to collapse for storage, it is not necessary and the entire enclosure can be molded vs. assembled.

Figure 5:
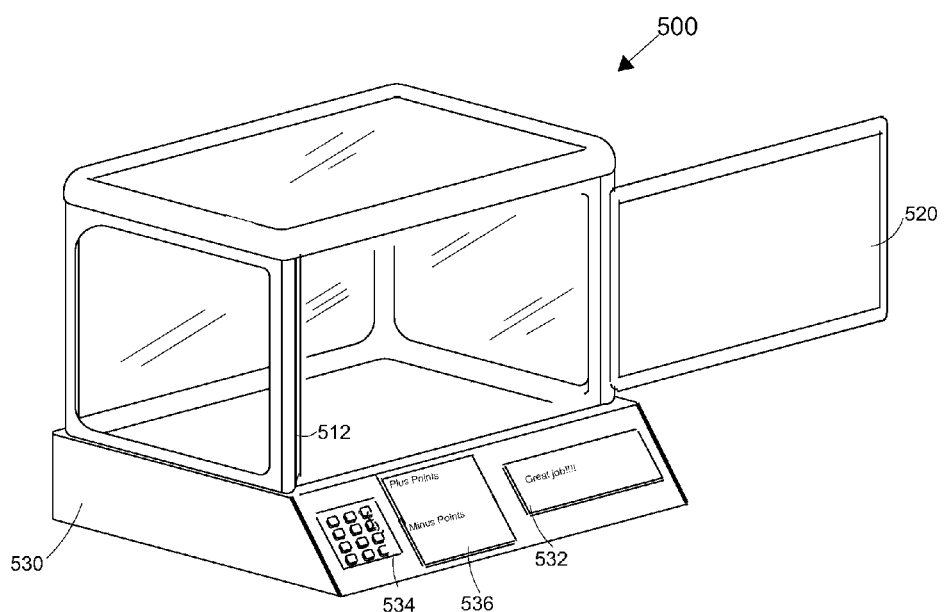
FIG. 5 is a perspective view of a further embodiment having a side opening door and the points chart in the base, in accordance with the invention.

In the embodiment of the reward system 100 illustrated in FIG. 1, a cage, or other enclosure, 110 and has been secured to a base 130 that contains the electronics used to control the reward system 100. The enclosure 110 comprises a frame 112 having three closed sides of the enclosure 110 and leaving the fourth side open for the door 120. Although the door 120 as illustrated in this embodiment opens upward, it should be noted that this is not necessary, as illustrated in FIG. 5. In any embodiment the door can open from either or both sides or from the bottom. Where space is an issue, the door can even slide within the enclosure, similar to a roll top desk.

The enclosure 110 as illustrated in this Figure uses a wire, or mesh, 116 to enclose the reward. This can provide some benefits when used with children as the reward can be positioned to be touched by the child. In this embodiment, the top 114, frame 112 and base 130 are adjacent to one another with the door 120 opening upward bringing it parallel to the plane of the top 114. The top illustrated in this embodiment is solid, however it could also be open and covered with the wire 116, similar to that illustrated in FIG. 2.

The base 130 has, in this embodiment, a raised key keypad 134 and screen 132 placed upon the base 130. The keypad 134 and screen 132 as illustrated extend out from the base 130 at an angle to facilitate data entry and reading. In situations where the reward is too large to fit into the enclosure 110, a picture in a frame can be substituted, or some other representation of the reward. Although not illustrated, the floor 122 can include notches or flanges to receive a frame (not shown) which can also be provided by the manufacturer. Alternatively, a free-standing frame can be used.

The screen 132 displays the number of points that have been earned currently and/or a graphic displaying the progress, such as a jar filled to the same percentage as the percentage of the goal that has been reached.

The screen 132, in conjunction with the microprocessor, can show a variety of graphics, based on whether points were gained or lost. Depending upon the method of input, new graphics can be provided and/or downloaded to personalize the system for age, sex and activity. The microprocessor integrates the functions of the central processing unit (CPU) of a computer onto one semiconductor chip or integrated circuit (IC). In essence, the microprocessor contains the core elements of a computer system, its computation and control engine. A power supply, memory, peripheral interface ICs, and peripherals (typically input/output and storage devices, keyboard, and/or display) form the complete computer system of the present invention.

The base 130, which contains, in the preferred embodiment, a microprocessor can be updated through the inclusion of a USB port to receive a keyboard or ports to transfer data from computer to computer. Additionally a wireless card, Bluetooth capability, hardwire internet connection or any other means of transferring or inputting data as known in the current art can be included. An output is preferably also provided to enable printing, transfer to a PC or laptop, smart phone or any other electronic device. Alternatively, a small printer can be included within the electronics base 130, eliminating the need to connect to an external printer. A speaker system can be connected to the microprocessor, providing motivational/encouraging sounds, songs and/or phrases. In this embodiment, the screen 132 only shows preprogrammed data and is not used for programming.

To enable transfer between devices, a software program/application is initially downloaded, wirelessly or hardwired, from the disclosed device to the receiving device. This enables easy transfer of a manufacturer determined format and data. More expansive programs can be downloaded from the manufacturer to enable reports, updates, etc.

In the embodiment of the reward system 200 illustrated in FIG. 2, the mesh 116 has been replaced with Plexiglas 216, glass or other clear material secured within the frame 212, that will prevent access to the reward. The solid top 114 has also been replaced with a clear top 214 and door 220. The base 230 has an angled front 236 into which keypad 234 and touch screen 232 have been set. The number pad 234 in this embodiment is preferably a touch screen and can be used for programming in conjunction with or separate from the touch screen 232. The programming of the reward system 200 using the touch screen 232 and keypad 234 can be similar to the programming of a telephone, TV or other device that does not have a keyboard.

As part of the overall system charts 270 and 272 can be provided, constructed with dry erase material, touch screens, LCD, etc., listing the ways in which points are earned and lost. A pre-filled chart 270 can be provided along with a blank chart 272 on which people can create their own point system. If so desired, the pre-filled chart 270 can be used on one side with constant items while variable items, such as gardening, can be added to the blank chart 272. Alternatively, the chart can have two sides (or split screen) displaying pre-filled items on one side and a blank chart on the other. There are a number of ways that the charts 270 and 272 can be incorporated with the reward system 100 and 200 that will vary depending upon the space available and location.

The reward system is preferably powered by rechargeable batteries and comes with a recharger, with the option to plug the device directly into the power source. Standard batteries can also be used. Alternatively, batteries can be omitted and the reward system 100 and 200 plugged directly into an outlet. Depending on the design, the reward system 100 and 200 can be hung on the wall or sit on a table or desk. For designs that are sold to hang on walls, the open back can be replaced with a solid material and hanging hooks can be placed on the frame, all as well known in the art.

The door 120 or 220 is locked through a number of methods, preferably being released though electronic means when the preprogrammed number of points is reached. In most designs the door will rest against a stop plate 512 of FIG. 5, to provide space for the lock and to prevent the door from continuing inward. The design of the door and locking mechanism can take on many designs that will be evident to those skilled in the art. In some embodiments it could be beneficial to lower the drain on the batteries and have manual locks used.

The goal is to reach a predetermined number of points and for purposes of simplicity herein the goal will be 100 points to open the enclosure door 120 and 220 for the person to retrieve their reward. The chart 270 or 272, preferably displays the points so that rewards and losses can be viewed and anticipated. For example, 5 points for cleaning the bedroom, 5 points for doing the dishes, 5 points for doing laundry, 5 points for picking up toys, as well as actions for which the person will lose points. Loss of points can include such actions as −5 points for talking back, −5 points for hitting a sibling, −5 points for bad grades, −5 points for not listening, and loss of points for failing to abstain from a negative habit, etc.

If the reward is large, each task can be worth fewer points, making it necessary to complete more tasks in order to obtain the 100 point goal. Alternatively, the reward can be something smaller, meant to be easier to achieve (such as something given at the end of each day). In that case, the tasks can be worth more points, meaning it would take fewer completed tasks to get the reward. As stated heretofore, the 100 point is an example and instead of altering the points per activity, the total points required can be altered.

The points can also be inputted using a "plus" button, a "minus" button and a numeric keypad 134 and 234. The "plus" button followed by the number of points earned or the "minus" button followed by the number of points lost or arrowed button as used in volume control. When points are added, a motivational graphic is shown on the screen, as well as motivational sayings, such as "Great job!", "You're doing great", "Keep up the great work!", "You're almost there!"

When points are subtracted encouraging sayings will play, such as "You can do better than that!", "Don't give up!", "Come on!", "You can do this!"

Alternatively, or in addition to, manually adding or subtracting the points with the keypad, the touch screen can be programmed with a variety of activities common to the household and directed to the task and age. The person could then activate the screen, go to a reward section and press the icon to indicate that activity. The points are automatically entered or subtracted and the appropriate animation and saying displayed.

In a highly programmable system, upon initiation of the system at purchase, at the start of a new reward or any time during the reward process, the total points to be can be programmed by the code holder. For example, in embodiments where the programming accepts the action, the points can be preprogrammed in and represented by an icon. Once the parent enables points to be entered, the child can press the icon and congratulatory words and the number of points received, as well as other data, can be displayed. This enables the system to be used not only as a tool for motivation but also to enhance math and reading skills. This is accomplished most easily through the use of a downloadable program onto a computer at which point the points, displays, etc. would be programmed. The data would then be downloaded into the reward system microprocessor.

To be truly effective, especially with young children, the time span between the act and the entry of the points should be as short as possible. Further, in the busy lives everyone leads today, more and more time is spent away from home. To enable the minimal time between the act and the point entry, a phone or other smart device application can be downloaded for point entry directly to the phone. The application data would then be downloaded from the phone or smart device onto the computer via means available to the phone or smart device. Alternatively, points can be sent to the computer via text for direct entry into the program. The specific manner of communication between the reward program and updating the specifics to the reward system software will be known to those skilled in the art.

To prevent tampering, the person responsible for adjusting the points will develop a code that would be required to be entered prior to adjusting the points, whether adjustment is through icons or keypad. The code can be set any number of ways, depending on the system. Depending upon the system, it could be preferable that the password be entered a second time for confirmation. After the password is set, it would need to be entered each time the points need to be adjusted. Alternate methods, such as swipe cards, fingerprint recognition, coded passwords, etc., can also be used and will be evident to those skilled in the art. A manual override key can also be incorporated into the system in the event passwords are forgotten and the system is permanently disabled.

Although the reward system can be non-electronic, its primary value would be the versatility achieved using computer, LCD display charts, and automatic opening of the doors upon achieving the preprogrammed number of points. An additional benefit to a computer based design would be the ability to have multiple secondary users in the same system. Each secondary user would be programmed in with their points per task and total points for reward as well as individual primary user programmable, audio and visual feedback and interaction. The ability to provide age/task/event specific graphics and sound adds to the appeal of the system, especially for children.

In instances where there are multiple people using the system it may be necessary to add a second enclosure unit as illustrated in FIG. 4. The addition of the enclosure 450 on top of enclosure 410 can be either a factory design or the system can be upgradable for multiple enclosures. In this embodiment, the frames 412 and 452 would have the ability to be electronically plugged in together to enable the electronics within the base 430 to release both enclosures 412 and 452. The system can be programmed by the primary user through the keypad 434, touch screen 432 or software download.

In FIG. 5, the chart 536 has been placed on the base 530 and would display the points gained or lost for each item. The chart 536 can be, as stated heretofore, either a manual entry (chalk, whiteboard, etc.) or an electronic touch activated screen. Although this embodiment has the chart 536 positioned between the screen 532 and the keypad 534, this is by way of example and any dimensioning and/or placement can be used. In this embodiment, the door 520 has also been hinged to open at the side and locking against stop plate 512.

Figure 6:
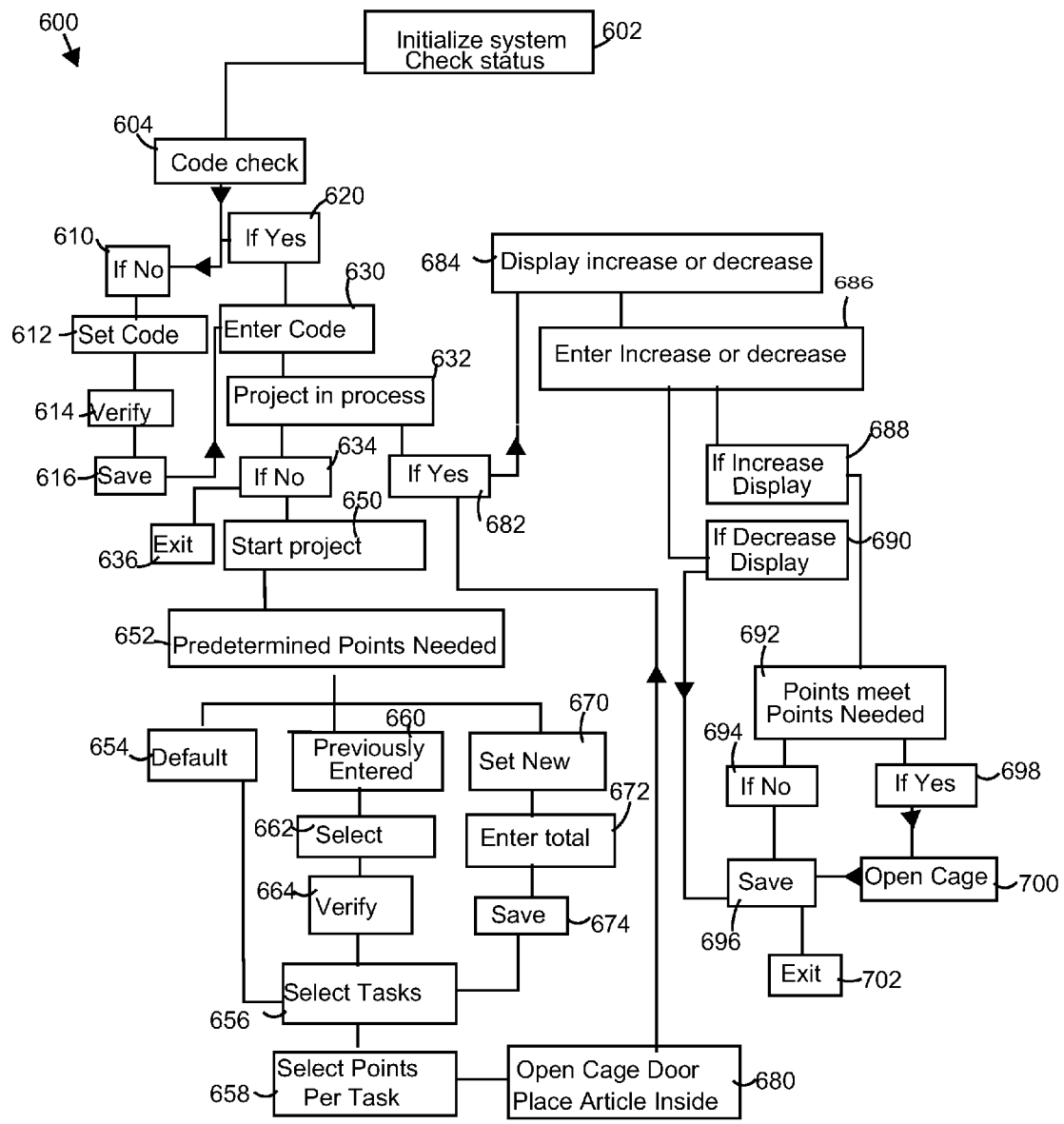
FIG. 6 is a flow chart of an example sequence for the reward system, in accordance with the invention.

An example flow chart 600 is illustrated in FIG. 6 showing one possible path of logic that can be taken although other paths will be known to those skilled in the art. Upon initialization and check status of the system 602, whether or not a code has been set during the code check 604. If no code has been set 610, the system displays set code 612 and the primary user takes action to set the code which is verified 614 and then saved 616. Once the code is saved the code is entered into the system 630.

If there is an access code 620, the system requires the primary user to enter access code 630 and, once the code is entered 630, the system to check whether there is a project in process 632. In some situations, such as where the primary user is also the secondary user, the access code 630 can be overridden, thereby eliminating the need for entry. If there is no project in progress, 634, the primary user can either exit 636 or start a project 650. To start a project, the predetermined points needed 652 to release the reward are entered with the primary user being given the choice between default 654, last entered 660 and set new 670. The default 654 would be the manufacturer's set points, for example the 100 points can be used herein. Previously entered 660 would be listing of the prior set number of points stored in the system for the user to select 662 and verify 664. The set new 570 asks the primary user to enter the total of points 672 and then save 674 this number into the system. At this point the system requests the primary user to select tasks 656 and the points per task 658. Once completed, the enclosure door is open 680 for the article to be put inside.

The system then moves to yes 682 a project is in process 632, displaying whether this is an increase or decrease 684 and requesting the entry of the increase or decrease 686. If it is an increase 688 the appropriate display is shown and the system checks to see if the points now meet the predetermined points needed 652 and, if so 698, opens the enclosure 700. If the points are not met 694, the updates are saved 696 and the system exits 702. When the points are decreased 690 the appropriate display is shown and the updated points saved 696 and the system exited. 702.

It will be noted by those skilled in the art that not every detailed step is illustrated in the flow chart 600 and that some steps, such as those described subsequent to predetermined points needed 652 can, preferably, be repeated after the select tasks 656 and select points per task 658. Steps can also change sequence. The addition of each check point and decision that can be made by the microprocessor would be too extensive and would not affect the overall concept of the reward system.

Figure 7:
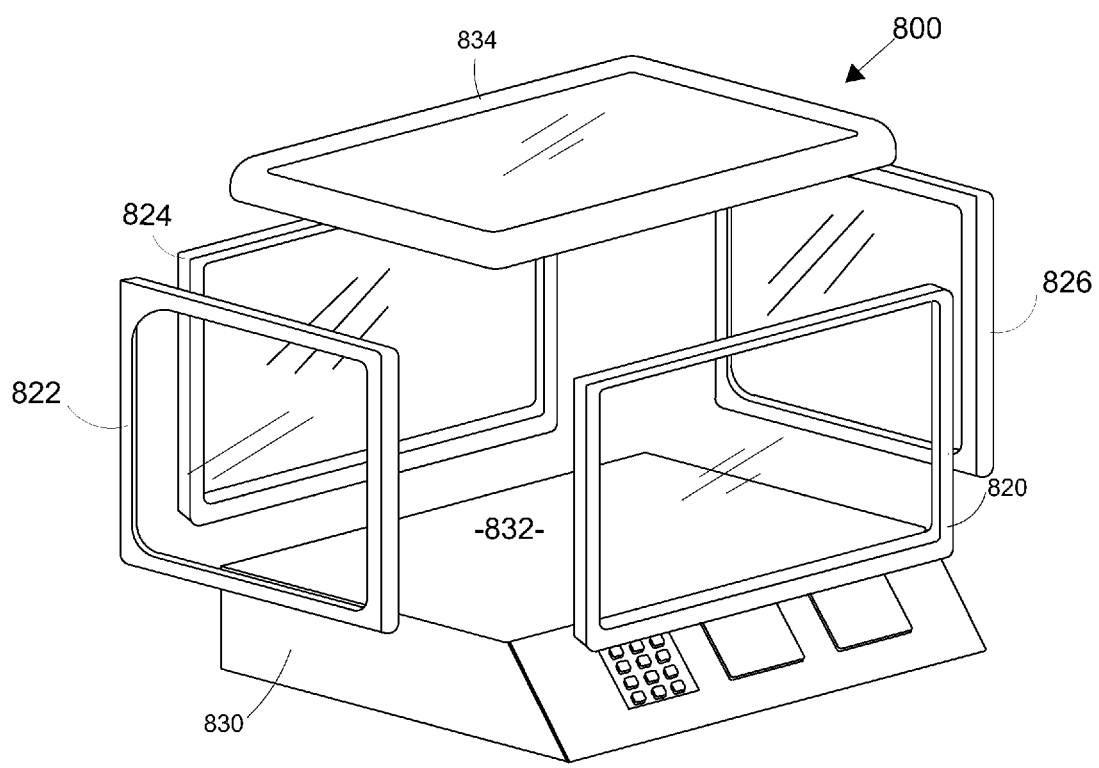
FIG. 7 is an exploded view of the individual components of the motivational device in accordance with the invention.

In FIG. 7 the motivation system 800 has been exploded to illustrate one design for a collapsible unit. In this embodiment, a series of bottom connectors would be placed on the bottom of the sides 822 and 825, back 824 and front 820 and a series of top connectors placed on the top of the sides 822 and 825, back 824 and front 820. Two examples of connection methods are illustrated in FIGS. 8 and 9.

Figure 8:
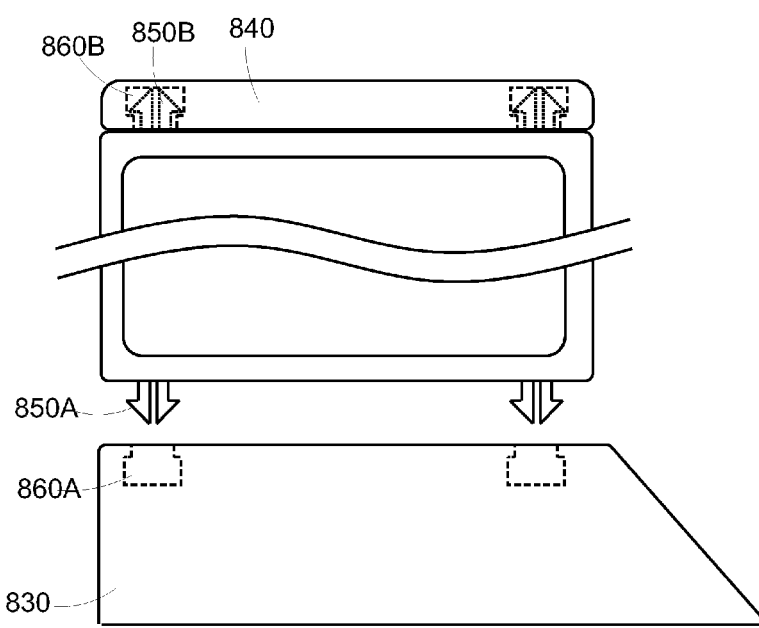
FIG. 8 is a cutaway view of an assembly system for the device in accordance with the invention.

In FIG. 8 the bottom tabs 850A and top tabs 850B extend from the top and the bottom of the sides 822 and 825, back 824 and front 820 and are dimensioned to be received in slots 860A in the base 830 and 860B in the top 840. The slots 860A and 860B are spaced from the edge of the base 830 and top 840 a sufficient distance to enable the sides 822 and 825, back 824 and front 820 to remain flush with the edge of the base 830 and top 840. The tabs 850A and 850B in this illustration are known in the art and are used as examples only as other types of snap tabs will be evident to those versed in the art.

Figure 9:
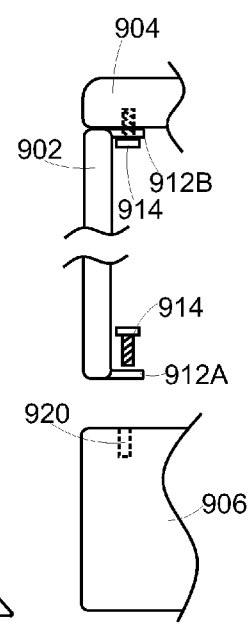
FIG. 9 is a cutaway view of an alternate assembly system for the device in accordance with the invention.

In FIG. 9 the side 902 (and remaining non-illustrated sides, back and front) have top connectors 912B and bottom connectors 912A that extend at right angles from the surface to be adjacent to the top 904 and base 906. The connectors 912A and 912B are attached to the top 904 and base 906 through use of bolts 914 that are received in threaded holes 920. Again, this is an example of one method only and other methods will become evident to those skilled in the art.

Figure 10:
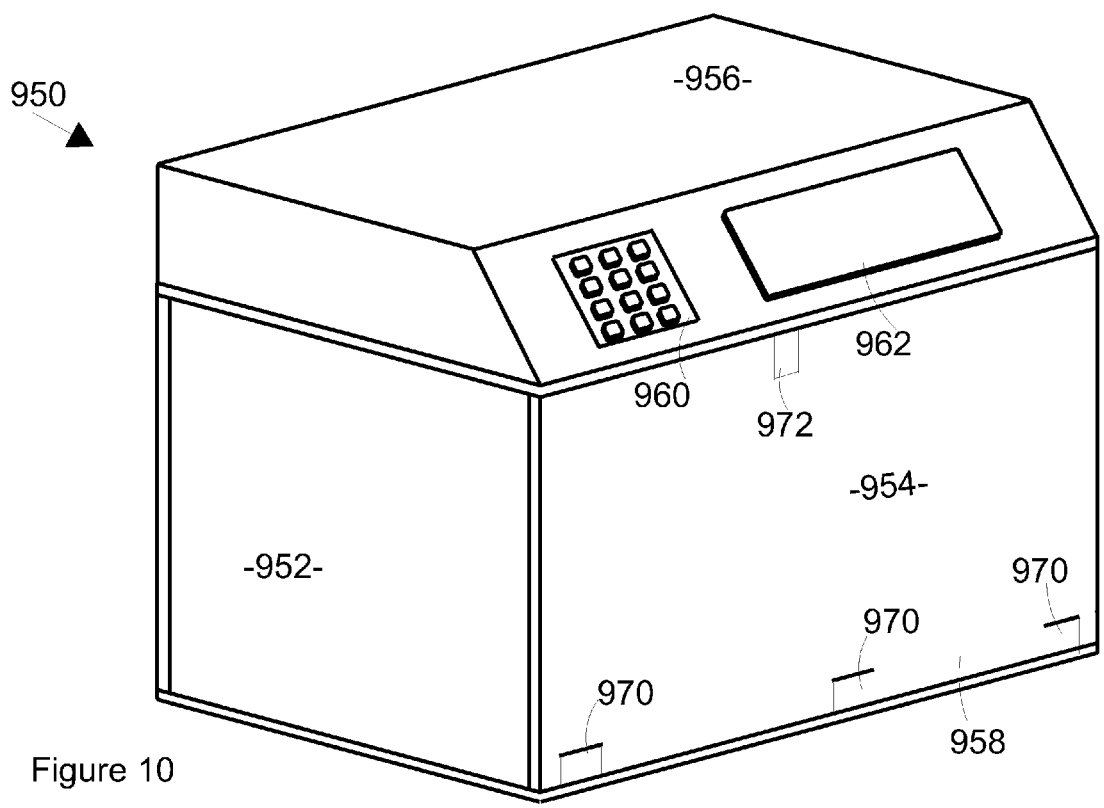
FIG. 10 is an alternate embodiment to the motivational device in accordance with the invention.

In the alternate embodiment of FIG. 10, the electronics receiving area 956 has been placed on the top of the motivational device 950. The keypad 960 and display 962 are now on the top of the enclosure. The sides 952 and front 954, along with the back (not illustrated) are made of a transparent material such as Plexiglas and glued together. The base 958 can be manufactured from any material that will support the device 950. In this illustration there is no actual door and the front 954 is hinged at hinges 970 to swing down completely once released from the lock 972. Alternatively a door could be positioned within the Plexi as with other embodiments.

There can eventually be numerous models geared toward different target audiences with charts customized for each group.

Simple math may be necessary in establishing the point system initially. A few examples could be provided in the instructions. For 20 tasks required to reach 100 points, each task would be worth 5 points or 10 tasks, each task would be worth 10 points. If you need $1,500 saved to go on a the trip, each $75 saved would be worth 5 points.

Although only rectangular enclosures are illustrated herein, it should be noted that any shape can be incorporated as long as it can hold the reward or a representation thereof.

The disclosed rewards system has a flexibility it provides that enables it to be used for all age groups and for most any use.

Examples of Potential Uses:
Parents:
Potty Training (kids gain points for going in the potty, washing hands, having no accidents for a certain period of time, etc.)
Rewarding good behavior (kids gain points for picking up their toys, listening, being well-behaved at the store, getting good grades, doing homework, sharing, doing chores, meeting curfew, exercising, eating healthy etc.)
Discouraging bad behavior (kids lose points for not listening, talking back, poor grades, getting in trouble at school, being mean to their siblings, breaking curlew, being disrespectful, etc.)

Family Unity:
Families could work towards rewards together, such as eating out or going to a movie (the menu for a favorite restaurant could be put in the enclosure or an ad for a movie the whole family wants to see could be printed out and placed in the enclosure.)

Teachers:
In the classroom points can be gained from reading books, good grades, fundraising, etc. When 100 points, for example, have been reached by the class, they get to have a pizza party or have some other fun activity. A picture depicting a party could be put in the frame and put into the enclosure of the reward system.

Counselors:
Counselors can use it to help their patients. They could set it up prior to the arrival of each patient (putting in the reward for that patient and entering the number of points that patient has earned). The reward system can be used to encourage positive behaviors and discourage negative behaviors making habits and breaking habits.

Couples:
Couples can use the reward system to improve their relationships. Each person uses the reward system to work towards a reward of choice and gains points in doing things for their partner.

Individuals:
Individuals can use the reward system to help motivate themselves. If they are unable to discipline themselves enough to not cheat the system, they could ask a friend or relative to be in charge of inputting the points. Again, it could be used to encourage good behavior (exercising, eating healthy meals or whatever they are trying to do more of) or to discourage bad behavior (smoking, drinking, cussing or whatever they are trying to do less of), Employers:
Companies can use it to motivate employees. The employees an compete for a bonus check, gift card to a restaurant, etc.

The reward system can also come in age related themes as well as being sized for the appropriate end use. Any of the features disclosed herein can be used with embodiments other than the one with which it is described.

BROAD SCOPE OF THE INVENTION

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims (e.g., including that to be later added) are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language of the present invention or inventions should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A motivational device to hold a physical reward comprising:
an enclosure, said enclosure having:
at least four sides, a top panel and a bottom panel, three of said at least four sides, said top panel and said bottom panel being affixed to one another to form said enclosure, at least one of said at least four sides being a door, said door being lockable, and being moveably affixed to one of said at least four sides, said top panel or said bottom panel, forming an interior reward receiving area, at least one of said at least four sides and said top panel enabling viewing of said interior;
an enclosed electronics receiving member, said enclosed electronics receiving member adjacent to and sharing one surface with one of said least four sides or said bottom panel and having three sides a bottom plate, and a front plate for visual display and data input, said electronics receiving member containing:
electronics within said enclosed electronics receiving member, said electronics having a microprocessor containing a program to enable data to be programmed by a primary user, said data including at least three from the group of a primary access code, user determined individual activity reward points, a required number of accumulated individual activity reward points to reach a goal and open said door, graphic display, at least one user determined goal to receive said reward, and the addition and subtraction of individual activity reward points for at least one secondary user,
data entry member within said front plate of said enclosed electronics receiving member for entry and updating of said data;
data display within said front plate of said enclosed electronics receiving member;
locking member, said locking member to interact with and control said door and being controlled by said electronics;
wherein said microprocessor is programmed to unlock said locking member to enable opening said door for removal of said physical reward when said required number of accumulated individual activity reward points are reached after the addition and subtraction of individual activity reward points or by entry of said primary access code.

2. The motivational device of claim 1 wherein at least three from the group comprising at least four sides, top panel and bottom panel are at least in part opaque and have members for viewing through said at least four sides and closure plate, wherein said members for viewing are transparent windows.

3. The motivational device of claim 1 wherein at least three of said at least four sides and top panel are transparent.

4. The motivational device of claim 1 wherein said data entry member is a keypad for data entry into said program.

5. The motivational device of claim 1 wherein said data entry member is a touch screen, said touch screen enabling said data entry into said program.

6. The motivational device of claim 1 wherein said top panel, said at least four sides and said electronics receiving member are individual units and configured to enable said units to be flat prior to assembly and flat after disassembled.

7. The motivational device of claim 1 wherein a side of said electronics receiving member opposing said one surface shared with one of said at least four sides extends beyond said one surface to receive said front plate to place said front plate at an angle with respect to said top panel.

8. The motivational device of claim 1 wherein said electronics produce sound and display graphics.

9. The motivational device of claim 1 further comprising a computer port to upload and download data.

10. The motivational device of claim 1 further comprising an internal printer.

11. The motivational device of claim 1 further having a second, partial enclosure, said partial enclosure being in communication with said program to provide two, separately programmable, reward receiving areas.

12. The motivational device of claim 6 further comprising releasable connection members, said releasable connection members enabling assembly and disassembly of said enclosure.

13. A motivational device to hold a physical reward comprising:
an enclosure, said enclosure comprising:
at least four sides, at least three of said at least four sides being removably connected to one another and removably connected to a base and a top, and at least one of said four sides enabling viewing of the interior of said enclosure while preventing access by at least one from the group of wire, mesh, translucent material, and transparent material,
a door, said door being one of said at least four sides and being moveably affixed to one of said at least four sides, said top panel or said bottom panel, and having a locking member for electronically locking and unlocking said door,
an electronics receiving member, said electronics receiving member having a bottom plate, three sides and an angled front plate extending from said base to said bottom plate, said electronics receiving member having a microprocessor containing a program to enable data to be programmed by a primary user, said data including at least a primary access code, user determined individual activity reward points, a required number of accumulated individual activity reward points to reach a goal and open said door, graphic display, at least one user determined goal to receive said reward, and the addition and subtraction of individual activity reward points for at least one secondary user to be programmed,
data entry member within said angled front plate for entry and updating of said individual activity reward points and said user determined goals, said data entry member being at least one from the group comprising key pad, arrow buttons or touch screen,
data display, within said angled front plate,
port member for uploading and downloading data,
wherein said microprocessor is programmed to unlock said locking member when said required number of accumulated individual activity reward points are reached after the addition and subtraction of individual activity reward points or by entry of said primary access code.

14. A method of motivating through the achievement of reaching a goal and obtaining a reward, comprising the steps of:
setting a goal and establishing a required number of accumulated individual activity reward points to achieve said goal,
an enclosure having a top panel, at least four sides, a bottom panel, one of said at least four sides or said top panel forming a door, programming by a primary user a microprocessor within an electronics housing adjacent said enclosure and having at least four sides and a bottom plate, said microprocessor containing a program to enable entry of a primary access code, user determined individual activity reward points, a required number of accumulated individual activity reward points, display, user determined goals, and the addition and subtraction of said individual activity reward points for at least one secondary user to be programmed through a data entry member within said enclosure, directing said program to open a door to aid enclosure using a primary user password, placing said reward into said enclosure, entering into program said required number of accumulated individual activity reward points, closing said door and locking said reward within said enclosure, entering into said data entry member, data representing said individual activity reward points gained or lost through a secondary user's predetermined activities, monitoring progress of said individual activity reward points gained or lost on a display screen, unlocking said door by said program upon reaching said user determined required number of accumulated individual activity reward points, thereby enabling removal of said reward.

* * * * *